(12) United States Patent  
Nimberger

(10) Patent No.: US 9,328,843 B2  
(45) Date of Patent: May 3, 2016

(54) VALVE BONNET ASSEMBLY

(75) Inventor: Spencer M. Nimberger, Houston, TX (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 1356 days.

(21) Appl. No.: 12/876,440

(22) Filed: Sep. 7, 2010

(65) Prior Publication Data

US 2011/0068288 A1    Mar. 24, 2011

Related U.S. Application Data

(60) Provisional application No. 61/243,837, filed on Sep. 18, 2009.

(51) Int. Cl.
| | |
|---|---|
| *F16K 1/04* | (2006.01) |
| *F16K 31/50* | (2006.01) |
| *F16K 1/42* | (2006.01) |
| *F16K 1/38* | (2006.01) |

(52) U.S. Cl.
CPC ................. *F16K 31/506* (2013.01); *F16K 1/04* (2013.01); *F16K 1/385* (2013.01); *F16K 1/422* (2013.01); *F16K 31/50* (2013.01)

(58) Field of Classification Search
CPC ....... F16K 31/50; F16K 31/506; F16K 1/422; F16K 1/04; F16K 1/385
USPC ........... 251/264, 360, 333, 221–225; 137/597
See application file for complete search history.

(56) References Cited

U.S. PATENT DOCUMENTS

| | | | | |
|---|---|---|---|---|
| 4,280,680 | A * | 7/1981 | Payne ........................... | 251/175 |
| 4,711,268 | A * | 12/1987 | Coleman ....................... | 137/597 |
| 4,879,912 | A * | 11/1989 | Suckow ..................... | 73/861.61 |
| 7,578,496 | B2 * | 8/2009 | Heelan et al. ................. | 251/265 |

\* cited by examiner

*Primary Examiner* — Atif Chaudry  
(74) *Attorney, Agent, or Firm* — Renner, Otto, Boisselle & Sklar, LLP

(57) ABSTRACT

The valve bonnet assembly (1) includes a bonnet stem and a valve member supported on the stem. Rotation of the stem (16) axially moves the valve member (12) along the stem axis into and out of sealing engagement with a seat (11). The bonnet stem includes multiple start threads, and the thread pitch divided by a number of starting threads is greater than or equal to 6 and less than or equal to 9.

16 Claims, 4 Drawing Sheets

VALVE BONNET ASSEMBLY

CROSS-REFERENCE TO RELATED APPLICATION

This application claims the priority of U.S. Provisional Application No. 61/243,837 filed on Sep. 18, 2009, the disclosure of which is incorporated herein by reference for all purposes.

FIELD OF THE INVENTION

The present invention relates to hand operated flow instrumentation valves of the type commonly used in the calibration of differential pressure based flow measurement systems. More particularly, this invention relates to the stem and bonnet assembly used in certain types of flow instrumentation valves which will significantly reduce the number of turns of the hand operated handle required to open or close the valve, thus reducing the likelihood of repetitive motion injury and speeding up the flow instrument calibration process.

BACKGROUND OF THE INVENTION

Manually operated differential pressure based flow instrument calibration manifolds are common in flow measurement systems. A special type of manifold is unique to the gas flow measurement industry.

Over a decade ago a research arm of the gas industry identified a flow measurement issue unique to compressible gas flow measurement. The issue is called "Gauge Line Error" (GLE). Past practice in the industry was to mount the measurement instruments on pipes or racks away from the primary differential pressure (DP) instrument mounted in the flow line for convenience. Typically long and small diameter pressure lines were run for this purpose. The research entity discovered that when the pressure lines were of small diameter, changed size over the run, or were sufficiently long, the pressure signal would often be distorted through amplification or attenuation of the pressure signal as the line changed diameter or direction, or simply due to the length of the signal line. This would lead to an erroneous DP signal being presented to the DP measurement instrument and thus the flow calculation was erroneous.

The recommendation to address the problem was for the signal lines to be as short as possible and be of constant 0.375 diameter, which is the approximate size of the standard signal line hole in the primary instrument mounted on the pipeline.

Prior to this point in time, the gas flow measurement industry had used a standard sized (0.186 Dia or 0.250 Dia.) soft conical seated valve for the calibration instruments. With the news of the GLE issue, a new type of manifold came into use which was called a "large bore manifold." The large bore manifold also had a soft cone seat as preferred by the industry, but due to the 0.375 size of the signal bore the hand operated stem of the manual valve had to travel much further than the smaller cone design. This new travel requirement combined with the industry standard 20 to 24 pitch threads on the stem resulted in from approximately 10 to 12 turns of the handle being required to open or close the valve.

Given that an instrument calibration technician can often be called on to calibrate dozens of flow measurement points in a single shift and that each of these requires operating two of these large bore valves in each manifold, reducing the time and number of turns to open and close these valves would be very advantageous both from a time and possible repetitive motion injury basis.

Simply reducing the pitch of the stem thread has its practical limitations, since the stem diameter cannot typically exceed 7/16 inch due to size constraints imposed by the standard bonnet design. To put a 14 pitch thread on a 7/16 diameter stem is approaching the practical limit for that stem diameter due to the thread height of approximately 0.071, whereas the 20 pitch thread typically used for that stem diameter is 0.049.

It would be desirous to reduce the pitch well beyond 14 pitch to minimize the turns required to open and close the valve. At some point, however, the "fast" pitch of the thread would make the valve hard to operate at the typical maximum operating pressures of from 900 to 2,000 psi. Further, at some point the faster pitch stem would allow the valve stem to "self open" under pressure or prolonged vibration that may occur in these applications.

The present invention achieves the goal of minimizing the turns to open and close while preserving the operability and reliability of the valves used in the gas flow calibration manifolds.

SUMMARY OF THE INVENTION

In one embodiment, a standard large bore orifice bonnet is adapted with a 4 start 28 pitch thread to give the bonnet an operating effective pitch of 7, which allows open and close operation of the valve in approximately 3.25 turns. The use of multiple start threads in this application reduces the operating turns to a minimum while preserving the required operating characteristics of the valve. A further advantage of this invention is that it preserves the existing profile of the current valve bonnets and thus eliminates the need for redesign of the base manifold to accommodate a larger bonnet. A range of multiple leads and pitches are possible while essentially satisfying the operation and reliability goals of the valve.

These and further features and advantages of the present invention will become apparent from the following detailed description, wherein reference is made to the figures in the accompanying drawings.

DETAILED DESCRIPTION OF PREFERRED EMBODIMENTS

Figure 1:
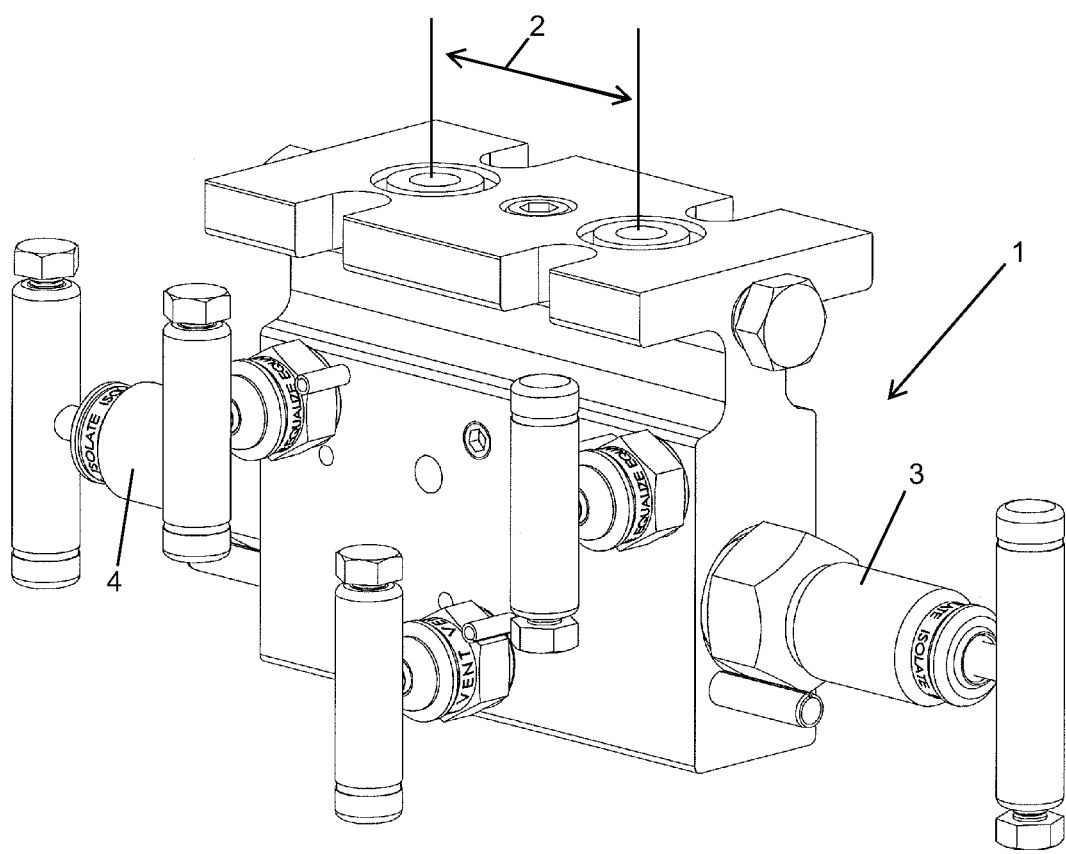
FIG. 1 is an isometric view of a 5 valve gas flow measurement manifold.

FIG. 1 illustrates a 5 valve manifold 1 having inlet and outlet pressure line spacing 2 of from 2.00 to 2.250 inches and having two bonnet assemblies 3 and 4 for manual operation of the manifold.

Figure 2:
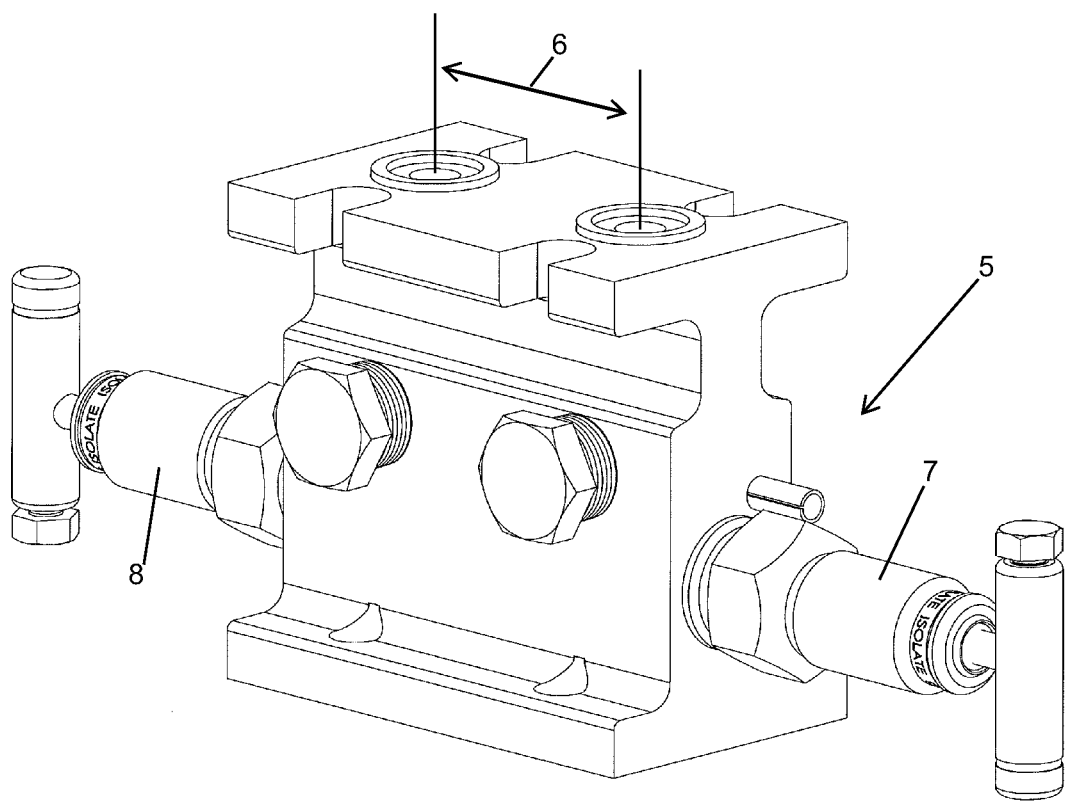
FIG. 2 is an isometric view of a 2 valve gas flow measurement manifold.

FIG. 2 illustrates a 2 valve manifold having inlet and outlet pressure line spacing 6 of from 2.00 to 2.250 inches and having two bonnet assemblies 7 and 8 for manual operation of the manifold.

Figure 3:
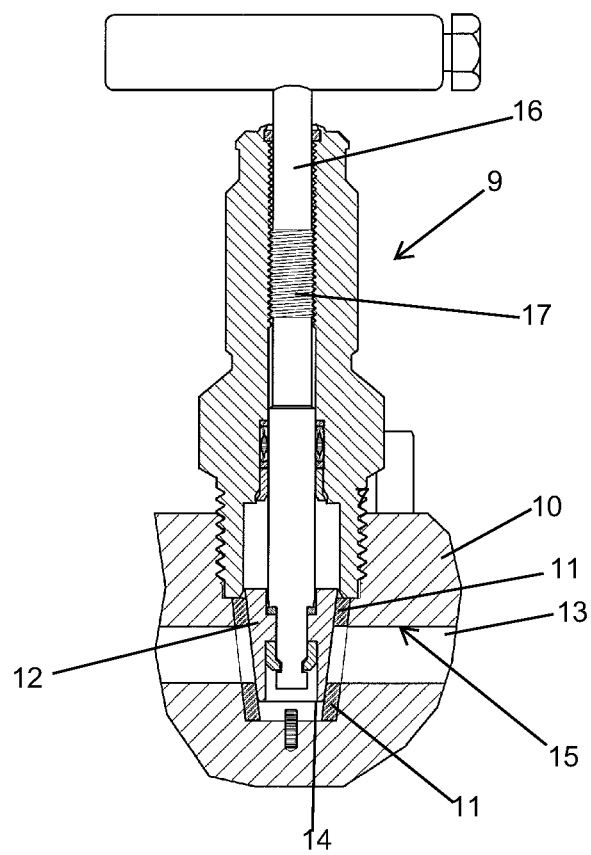
FIG. 3 is a sectional view of a soft seat 0.375 orifice manual valve bonnet assembly with o-ring seals.
Figure 4:
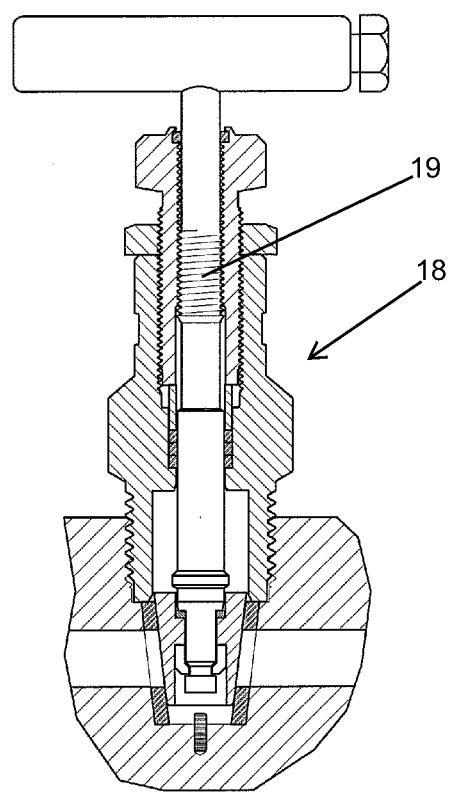
FIG. 4 is a sectional view of a soft seat 0.375 orifice manual valve bonnet assembly with compression ring seals.

FIG. 3 illustrates an o-ring style bonnet assembly mounted in the body 10 of either a 2 or 5 valve manifold as shown in FIGS. 1 and 2. The non metallic valve seat 11 is shown with the conical tip 12 of the valve stem assembly engaging the non metallic seat 11 thereby closing off flow through the manifold orifice 13.

To open the valve for complete flow through the orifice 13, the conical tip or valve member 12 is raised a distance until the end 14 of the conical tip is above the high point 15 of the orifice 13. Raising the stem this height with the normal 20 or 24 pitch stem threads results in from 9 to 11 turns to operate the valve from complete closed to full open and the reverse.

In the preferred embodiment of the present invention, the stem 16 is machined with 4 start 28 pitch threads 17 which results in an effective pitch of 7 and will cause the valve to operate from full open to close in 3.25 turns, thereby significantly reducing the number of turns to operate the valve.

In a compression ring seal version of the valve bonnet assembly 18, the stem threads 19 are machined with 4 start 28 pitch threads resulting in 3.25 turns to open or close the valve.

In a preferred embodiment, a non-metallic cone seat manual valve bonnet assembly is provided with an orifice having a diameter of from 0.360 to 0.390 inches, or from 0.230 to 0.270 inches, or from 0.170 to 0.190 inches. The manifold includes two or more operating valves, with two valves controlling line pressure having a center-to-center spacing of from 2.0 inches to 2.250 inches. The bonnet stem utilizes two or more starting threads, and preferably three or more starting threads with the thread pitch of each starting thread divided by the number of starting threads being greater than or equal to six and less than or equal to ten, and in many applications will be greater than or equal to six and less than or equal to nine.

A valve assembly of the present invention may be used with a valve body intended for receiving one operating valve or with a manifold having two or more operating valves. The bonnet stem is rotated by a conventional handle, which causes the valve member at the end of the stem to move into or out of engagement with the seat in the valve body or manifold. The bonnet stem utilizes multiple start threads, and preferably the thread pitch divided by the number of starting threads being greater than or equal to six and less than or equal to ten. In some applications, the bonnet stem may utilize three or more starting threads with a thread pitch divided by the number of starting threads is greater than or equal to six and less than or equal to ten. The bonnet assemblies may be used on a manifold for receiving two or more operating valves, with close line pressure spacing between the valves from 2.0 to 2.250 inches.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A valve bonnet assembly including an operating valve bonnet stem, rotation of the stem axially moving a valve member supported on the stem along a stem axis and into and out of sealing engagement with a seat, the bonnet stem including a multiple start thread wherein the thread pitch divided by the number of starting threads is greater than or equal to six and less than or equal to ten.

2. A valve bonnet assembly as defined in claim 1, wherein the seat is a nonmetallic seat for sealing with the valve member.

3. A valve bonnet assembly as defined in claim 2, wherein the seat has a conical outer surface.

4. A valve bonnet assembly as defined in claim 1, wherein two or more valve bonnet assemblies are each mounted on a manifold with pressure line spacing between the bonnet assemblies being from 2.0 to 2.250 inches.

5. A valve bonnet assembly as defined in claim 1, wherein the thread pitch on the bonnet stem divided by the number of starting threads is greater than or equal to six and less than or equal to nine.

6. A valve bonnet as defined in claim 1, wherein the valve stem has a stem diameter less than or equal to 7/16 inch.

7. A valve bonnet assembly for use on a manifold for supporting two or more operating valves, a pressure line spacing between the two valves from 2.0 to 2.250 inches, and the bonnet stem utilizing three or more starting threads, wherein a thread pitch divided by the number of starting threads is greater than or equal to six and less than or equal to ten.

8. A valve bonnet assembly as defined in claim 7, wherein the seat is a nonmetallic seat for sealing with the valve member.

9. A valve bonnet assembly as defined in claim 8, wherein the seat has a conical outer surface.

10. A valve bonnet assembly as defined in claim 7, wherein the thread pitch on the bonnet stem divided by the number of starting threads is greater than or equal to six and less than or equal to nine.

11. A valve including a body having a seat and an operating valve bonnet stem, rotation of the stem axially moving a valve member supported on the stem along a stem axis and into and out of sealing engagement with the seat, the bonnet stem including a multiple start thread wherein the thread pitch divided by the number of starting threads is greater than or equal to six and less than or equal to ten.

12. A valve as defined in claim 11, wherein the body includes a manifold and two or more valve bonnet assemblies are each mounted on the manifold with pressure line spacing between the bonnet assemblies being from 2.0 to 2.250 inches.

13. A valve as defined in claim 11, wherein the seat is a nonmetallic seat for sealing with the valve member.

14. A valve as defined in claim 13, wherein the seat has a conical outer surface.

15. A valve as defined in claim 11, wherein the thread pitch on the bonnet stem divided by the number of starting threads is greater than or equal to six and less than or equal to nine.

16. A valve bonnet as defined in claim 11, wherein the valve stem has a stem diameter less than or equal to 7/16 inch.

* * * * *